April 26, 1960 W. STELZER 2,934,042
BOOSTER MECHANISM
Filed Oct. 22, 1957 4 Sheets-Sheet 1

INVENTOR
WILLIAM STELZER

BY John F. Philips
ATTORNEY

April 26, 1960 W. STELZER 2,934,042
BOOSTER MECHANISM
Filed Oct. 22, 1957 4 Sheets-Sheet 3

INVENTOR
WILLIAM STELZER
BY John F. Phillips
ATTORNEY

April 26, 1960 — W. STELZER — 2,934,042
BOOSTER MECHANISM
Filed Oct. 22, 1957 — 4 Sheets-Sheet 4

INVENTOR
WILLIAM STELZER
BY John H. Phillips
ATTORNEY

United States Patent Office 2,934,042
Patented Apr. 26, 1960

2,934,042
BOOSTER MECHANISM

William Stelzer, Bloomfield Hills, Mich., assignor to Kelsey-Hayes Company, Detroit, Mich., a corporation of Delaware Application October 22, 1957, Serial No. 691,561

14 Claims. (Cl. 121—41)

This invention relates to a booster mechanism particularly adapted for use in the operation of vehicle brakes.

An important object of the invention is to provide a novel type of booster brake mechanism of the direct acting type, that is, wherein pedal and booster motor forces are directly mechanically applied to the master cylinder piston, and to provide such a mechanism wherein only a light initial pedal effort is necessary to start the energization of the motor and initiate movement of the master cylinder piston.

A further object is to provide such an apparatus wherein initial brake pedal movement takes place solely against relatively light springs and wherein the initial movement of the pressure responsive unit of the booster motor is applied through a novel mechanism, including a power transmitting spring, to the master cylinder piston and wherein during transmission of power through the spring referred to, no reaction is transmitted to the brake pedal.

A further object is to provide such a mechanism wherein the loading of the power transmitting spring referred to predetermines the point at which reaction will begin to be transmitted from the master cylinder piston to the brake pedal.

A further object is to provide an apparatus of this character wherein a novel lever mechanism is employed in conjunction with the pedal operated means, the booster motor, and the control valve mechanism therefor, and wherein initial operation of the brake pedal energizes the motor and the latter transmits operating forces to the master cylinder piston without causing the transmittal during the initial motor energization of any reaction forces from the master cylinder piston to the pedal, such reaction forces being transmitted only after the point of initial engagement of the brake shoes with the drums and the reaction being always proportionate to the force of brake application.

A further object is to provide such an apparatus wherein the booster motor and associated parts are particularly adapted for operation by a source of superatmospheric pressure and wherein a simple type of valve mechanism controls the motor and wherein the operation of such valve to energize the motor is the sole initial operation performed during the first portion of the movement of the brake pedal.

A further object is to provide a booster mechanism of the type referred to which adapts itself very readily for assembling into a unit particularly adapted to be mounted on the front of the fire wall of a motor vehicle to be operated by the brake pedal.

Other objects and advantages of the invention will become apparent during the course of the following description.

In the drawings I have shown one embodiment of the invention. In this showing:

Figure 1:
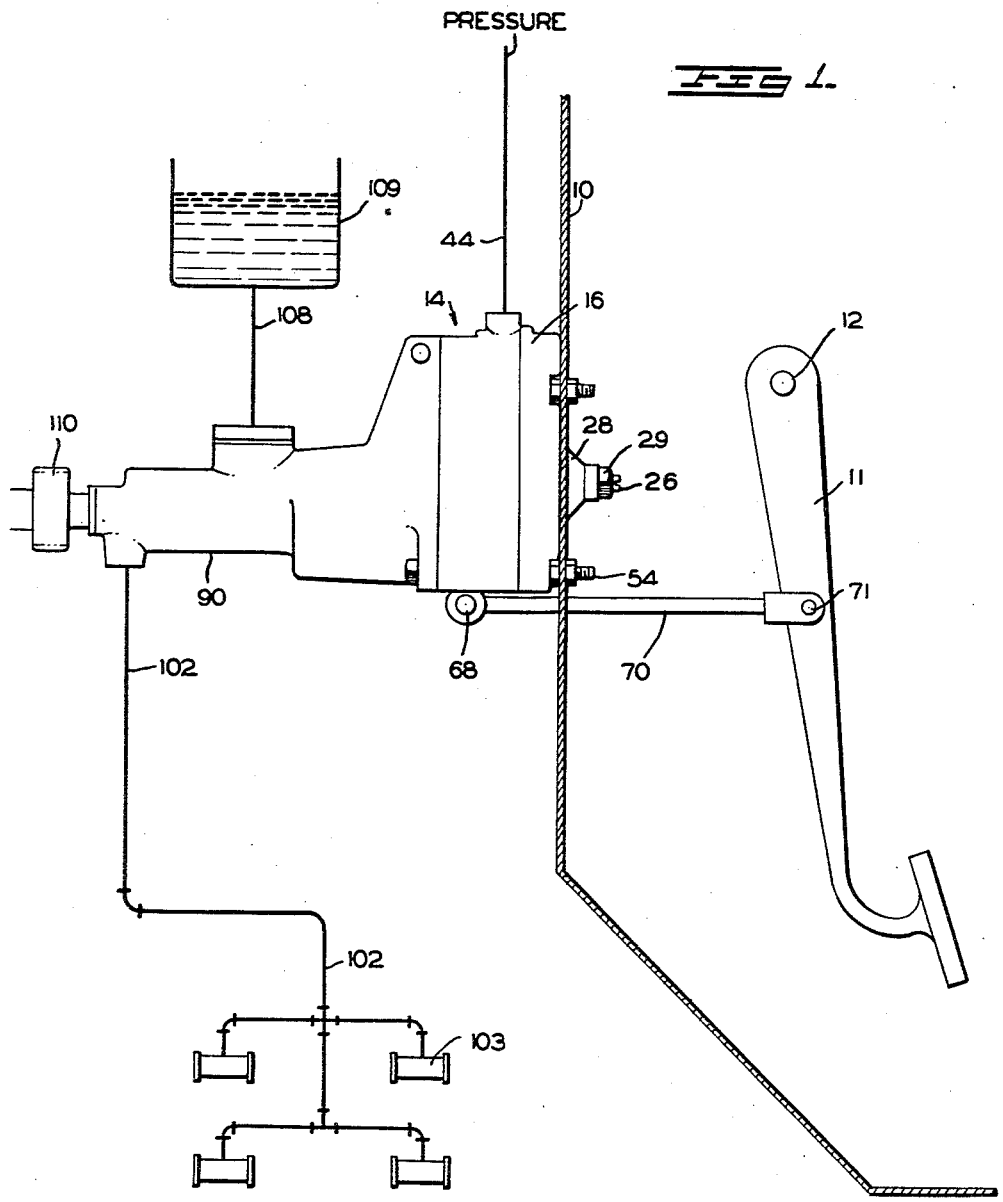
Figure 1 is a side elevation of the apparatus, the fire wall of the vehicle being shown in section and certain parts being shown diagrammatically.

Referring to Figure 1, the numeral 10 designates the fire wall of a motor vehicle, rearwardly of which is arranged a brake pedal 11 shown in the present instance as being of the hanging or depending type and pivotally supported at its upper end as at 12 by any suitable type of bracket or other support (not shown). The booster mechanism forming the subject matter of the present invention is indicated as a whole by the numeral 14 and is arranged against the forward face of the fire wall 10.

The booster mechanism comprises a preferably diecast body 16 secured against the forward face of the fire wall 10 in a manner to be described, the casting 16 being in the form of a cap member having an annular chamber 17 therein which forms the variable pressure chamber of the fluid pressure motor to be described. Preferably at the top thereof, the casing 16 is provided with a radial extension 18 to house a part of the valve mechanism described below.

A second die casting 20 has a flat rear face arranged against the similarly shaped forward face of the casting 16 and is annularly grooved as at 21 to receive the bead of a diaphragm 22 arranged against the rear face of and surrounding the periphery of a cup member 23 forming with the diaphragm 22 the pressure responsive unit of the motor. The cup member 23 is provided with a forwardly extending integral axial portion 24 having an axial bore 25 in which is arranged a rod 26 operative with respect to the resilient cushion 27 to limit the rearward movement of the pressure responsive unit of the motor. The body 16 is provided with a conical rear extension 28 in which the rod 26 is threaded, a jam nut 29 securely fixing the rod 26 in position. The rod 26 obviously is adjustable to predetermine any desired adjusted normal position of the pressure responsive unit of the motor. The conical formation of the extension 28 is provided to allow space for clamping means 30 by which the radially inner portion of the diaphragm 22 is secured to the cup member 23.

The casting 20 is provided at the top thereof with a radial extension 32 alined with the extension 18 and cooperating therewith to form a valve housing. Between these two extensions is clamped a valve seat 33 engageable by a conical valve 34 carried by a tubular stem 35. The valve 34 is arranged in a chamber 36 formed in the extension 18, and in such chamber is arranged a return spring 37 tending to seat the valve 34. The chamber 36 communicates with the motor chamber 17 through a passage 38.

The extension 32 is provided with a wall 40 sealed around the stem 35 as at 41, this seal and the valve seat 33 defining therebetween a chamber 42 communicating through a port 43 with a line 44 leading to a source of super-atmospheric pressure.

To the left of the wall 40 is formed a chamber 46, open to the atmosphere at 47, and a ball valve 48 is arranged in the chamber 46. This ball valve is normally disengaged from the adjacent end of the tubular member 35 and is engageable therewith to disconnect the interior of the tubular member 35 from the atmospheric chamber 46 when the brake is operated, as described below. The valve 48 is movable to closed position by the application of force to a short stem 49.

A master cylinder casting indicated as a whole by the numeral 52 is shaped generally in cross section to correspond to the shape of the adjacent flat end of the casting 20 against which the casting 52 is arranged. The three castings 16, 20 and 52 are provided with corresponding ears, as indicated by the numeral 53 (Figure 5), and bolts 54 pass through these ears and through the fire wall 10 to secure the assembly referred to, to the fire wall. The casting 52 is so shaped adjacent the casting 20 as to provide therewithin a substantial space 56 to provide space for a lever mechanism to be described.

Figure 2:
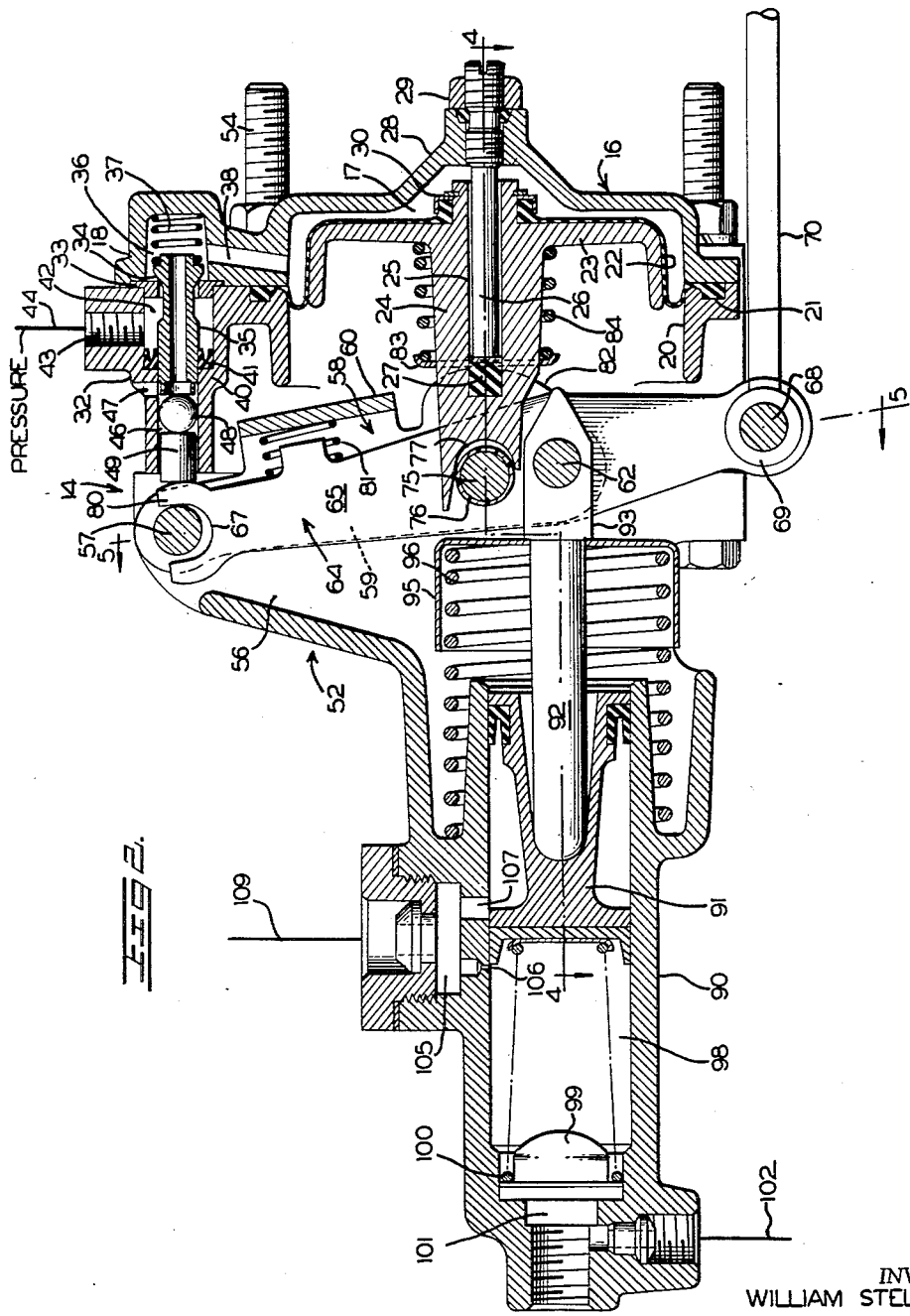
Figure 2 is an enlarged axial sectional view through the entire booster unit and including the maste cylinder, the parts being shown in normal positions.
Figure 3:
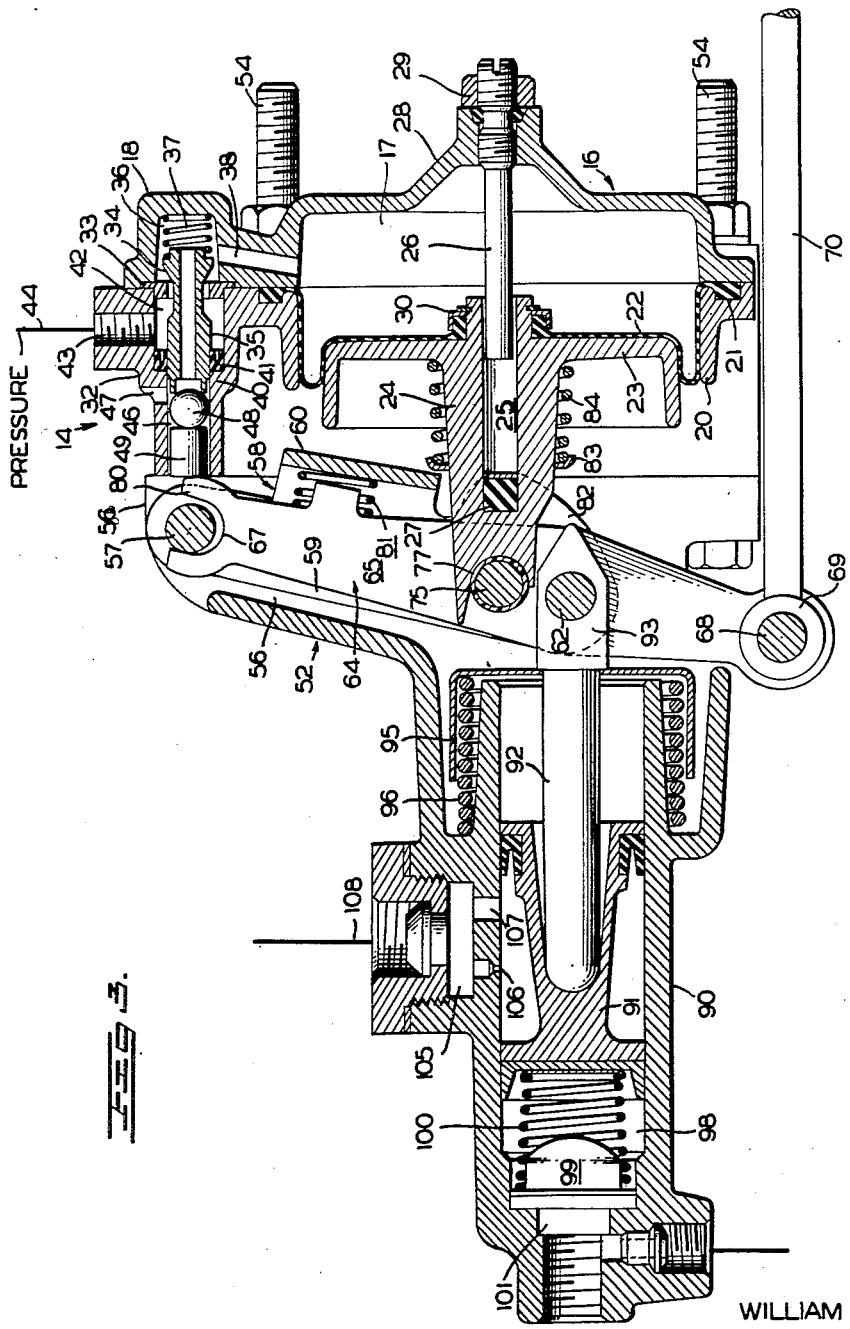
Figure 3 is a similar view with the parts shown in the positions they will occupy when the brakes are fully applied.
Figure 4:
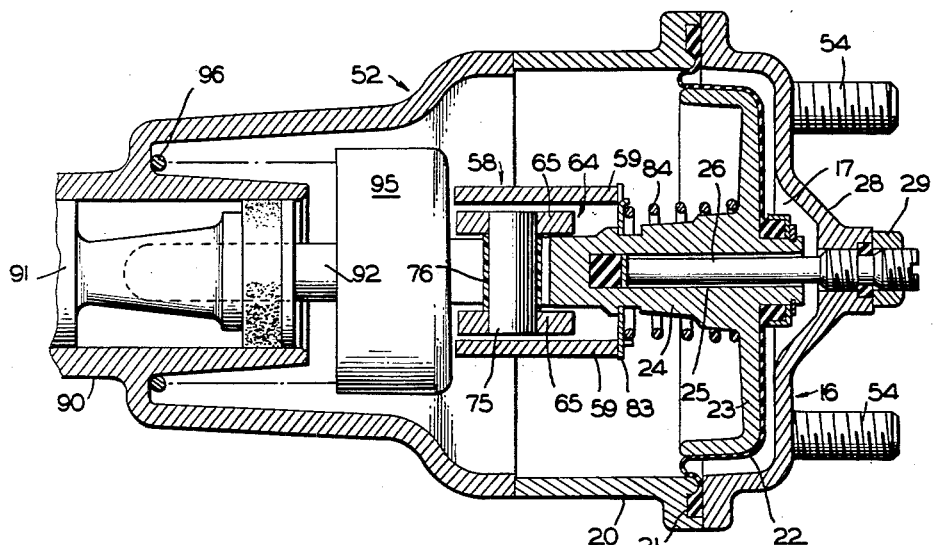
Figure 4 is a section taken substantially on line 4—4 of Figure 2.
Figure 5:
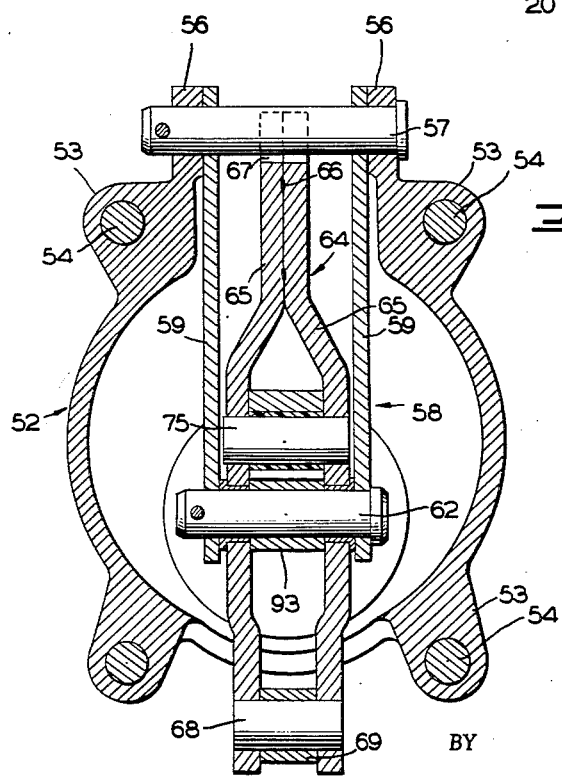
Figure 5 is a section taken substantially on line 5—5 of Figure 2.

Referring to Figures 2, 3 and 5, it will be noted that the casting 52 is provided with an open top defined by spaced wall portions 56 and through such wall portions extends a pivot pin 57. A lever 58 is arranged in the space within the castings 20 and 52 and comprises spaced parallel lever arms 59 connected rearwardly thereof by a preferably integral web 60. The upper ends of the lever arms 59 are pivotally supported by the pin 57.

A pivot pin 62 passes through the lower ends of the lever arms 59. A second or operating lever 64 is arranged between the levers 59 and comprises a pair of lever arms 65, spaced throughout a substantial portion of the lower ends thereof and arranged flat against each other at their upper ends and preferably welded together as at 66. It will become apparent that the pivot pin 62 pivotally supports the lever 64. The upper ends of the lever arms 65 are notched as at 67 to span the pivot pin 57 and provide for lost motion between this pin and the lever 64.

At their lower ends, the lever arms 65 carry a pivot pin 68 passing through an eye 69 carried by the forward end of a rod 70, the rear end of this rod being pivotally connected as at 71 to the brake pedal.

At a point spaced above the pivot pin 62, another pin 75 extends through the lever arms 65 and is surrounded by an elastic sleeve 76. This sleeve is arranged within a forwardly opening recess 77 formed in the forward end of the axial projection 24, the sleeve 76 being spaced from the rear extremity of the recess 77 when the parts are in the normal positions shown in Figure 2.

It will be apparent from Figures 2 and 3 that the notches 67 in the upper ends of the lever arms 75 form a yoke 80, the rear edges of the rear arms of which engage the rod 49 to effect movement of the valve 48 when the push rod 70 is operated by the brake pedal. Under such conditions, as further described below, the lever 64 pivots about the pin 62, and movement of the valve mechanism to energize the motor takes place without contact between the sleeve 76 and recess 77. Such movement takes place solely against the loading of the relatively light spring 37 and against the loading of a similar spring 81 interposed between the lever 64 and web 60, as clearly shown in Figures 2 and 3.

As further described below, operation of the motor transmits a force to the lever 58 when the motor is initially operated. To effect such operation, the lever arms 59 are provided with rear abutments 82 engaging against a spring seat 83 engaged by a spring 84 surrounding the adjacent portion of the axial extension 24.

The casting 52 includes a master cylinder 90 having a plunger 91 therein operable by the forward end of a push rod 92 the rear end of which carries a bearing 93 through which the pivot pin 62 extends. The forward end of the bearing 93 forms a shoulder engaging a cup 95 forming a seat for a spring 96, the forward end of which engages the casting 52 around the master cylinder 90 to bias the push rod 92 to its normal off position shown in Figure 2.

The plunger 91 is movable to displace fluid from a hydraulic chamber 98, past a residual pressure valve 99, and a spring 100 of conventional type is arranged between the residual pressure valve 99 and the plunger 91. Fluid displaced from the chamber 98 flows into a chamber 101 and thence through suitable lines 102 (Figure 1) to the vehicle brake cylinders 103.

The casting 52 is provided with the usual fluid replenishing chamber 105 communicating with the chamber 98 through a conventional port 106 and communicating with the cylinder 90 back of the head of the plunger 91 as at 107. Fluid may be supplied to the chamber 105 in any suitable manner, for example, through a pipe 108 from a reservoir 109. A conventional stop light switch 110 may be connected to the master cylinder (Figure 1).

Operation

The parts normally occupy the positions shown in Figure 2, the valve 34 being closed and the valve 48 open. The recess 77 will be spaced from the resilient sleeve 76 as in Figure 2. It will be apparent that the motor chamber 17 is connected to the atmosphere through passage 38, chamber 36, through sleeve 35, chamber 46 and vent opening 47.

When the brakes are to be applied, the operator will depress the pedal 11 (Figure 1) to move the rod 70 forwardly. This rod is connected to the lower end of the lever 64 (Figures 2, 3 and 5), and movement of the rod 70 will cause the lever 64 to pivot on the pin 62, thus moving the upper end of the lever 64 to the right from the position shown in Figure 2. This movement referred to will move the valve 48 against the left-hand end of the sleeve 35 (Figure 2), and then the ball valve 48 will transmit movement to the sleeve 35 to open the valve 34. This movement of the valve sleeve 35 takes place against the light loading of the spring 37. Up to this point, therefore, the operator encounters only the light resistance represented by the loading of the spring 37 and 81. It will be apparent that, during this portion of the operation, the lever 58 will remain stationary.

Upon the cracking of the valve 34, super-atmospheric pressure will flow from the chamber 42 into the chamber 36 and through the passage 38 into the motor chamber 17, whereupon the pressure responsive unit of the motor will move toward the left from the off position in Figure 2. Initial movement of the body 23 of the pressure responsive unit will transmit movement through the spring 84 to the spring seat 83. This spring seat engages the bosses 82 on the respective lever arms 59, and thus movement will be imparted to the lever 58, turning about the pivot pin 57, to impart initial movement to the pin 62 and thus initially move the fluid displacing plunger 91 of the master cylinder.

During such initial motor operation, force will be transmitted solely through the spring 84 to effect movement of the lever 58 to start the operation of the master cylinder plunger, no forces being required to be transmitted during this stage of operation by the pressure of the operator's foot on the pedal 11, and thus a 'soft' initial pedal is provided.

It will be apparent that during the stage of operation referred to, the operator will be moving the rod 70 toward the left for the operation of the valve mechanism, and movement transmitted to the pivot pin 62 through the spring 84 and bosses 82 will move the pivot pin to the left, thus tending through the initial operating stage referred to, to bodily move the lever 64, requiring that the operator continue to effect movement of the pivot pin 68 toward the left in Figure 2 to maintain the motor energizing position of the valve sleeve 35.

The spring 84 is of sufficient strength to impart movement in the manner stated to the plunger 91 to displace fluid past the residual pressure valve 99. Immediately upon engagement of the brake shoes with the drums, however, static pressure will be built up in the brake lines and in the master cylinder chamber 98, whereupon the spring 84 is no longer capable of transmitting movement through the lever 58 to the pin 62. The lever 58 will respond to the increased pressure in the master cylinder by overcoming the loading of the spring 84, whereupon the sleeve 76 will seat in the recess 77. From such point on, therefore, the motor will deliver power through the pivot pin 75 to the lever 64, above the pivot pin 62. The power thus applied to the lever 64 tends to swing the pivot pin 68 toward the right, thus providing direct reaction against the brake pedal. During the actual application of the brakes, therefore, part of the brake applying force will be applied by the motor and part by the operator, the ratio depending upon the location of the pivot pin 62 with relation to the respective pivot pins 68 and 75, as will be apparent.

If the brakes are partially applied and movement of the pedal 11 is then arrested, the pivot pin 68 will remain stationary and a slight additional movement imparted to the pivot pin 75 by the motor will swing the upper end of the lever 64 slightly to the left of the position shown in Figure 3 to close the valve 34, the air and pressure valves now being in lapped position. Any tendency for the motor to cause the valve to move beyond such position will result in the cracking of the ball valve 48, to release some of the pressure from the motor chamber 17. Thus a perfect follow-up action of the valve mechanism is provided and any desired brake application can be provided.

The fully brake applied positions of the parts are shown in Figure 3. The brakes obviously are released by releasing the pressure of the foot against the pedal, whereupon the valve spring 37 will promptly close the valve 34. The spring 81 will promptly move the upper end of the lever 64 to release pressure against the valve 48, whereupon this valve will be unseated by superatmospheric pressure in the motor chamber 17 and such pressure will be released to the atmosphere through the port 47. The spring 84, acting against the bosses 82, will return the lever 58 to its normal position, and, acting in the opposite direction, will return the pressure responsive unit of the motor to its off position.

It will be apparent that the lever 64 is wholly suppored by the pivot pin 62, carried by the lever 58 which is pivotally supported at its upper end by the pin 57. The lever 64 thus is a floating lever, all pivot points of which are free to move to accomplish the results referred to above. The apparatus is simple and compact in construction and may be wholly assembled before being bolted to the fire wall 10, as will be apparent. In operation, the desirable "soft" initial pedal is provided with no transmission of hydraulic reaction from the brake system to the brake pedal until actual brake application starts, whereupon there will be a direct and accurate proportionate hydraulic reaction transmitted to the brake pedal throughout the range of brake application.

Referring to Figure 3 is will be noted that the pivot pin 57 liimts movement to the right of the upper end of the lever 64. If it is necessary or desirable to provide a brake application beyond the point of "power run-out" of the motor, that is, beyond the point of maximum energization of the motor, the left end of the yoke 80 (Figure 3) will limit turning movement of the lever 64 and thereafter the levers 58 and 64 will turn as a unit. Beyond the point of power run-out, therefore, the motor will be exerting its maximum force against the pin 75, but the total force applied to the master cylinder plunger will be limited solely by the operator's ability to exert force against the brake pedal.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster mechanism comprising a member to be operated, a lever pivotally supported on a movable pivot and connected to said member, a fluid pressure motor having a pressure responsive unit, a valve mechanism connected to said lever and controlling communication between said motor and sources of relatively high and low pressures, operator-operated means connected to said lever to move said valve mechanism from normal position to connect said motor to said high pressure source to operate said pressure responsive unit, power transmitting means connected between said pressure responsive unit and said movable pivot, said power transmitting means including a spring having a predetermined loading for transmitting movement to said movable pivot upon initial operation of said pressure responsive unit, and means operative upon an increase in resistance to movement of said member to a predetermined point for rendering said spring ineffective for transmitting movement to said movable pivot and for establishing a positive mechanical connection between said movable pivot and said pressure responsive unit.

2. A booster mechanism comprising a member to be operated, a lever pivotally supported on a movable pivot and connected to said member, a fluid pressure motor having a pressure responsive unit, a valve mechanism connected to said lever and controlling communication between said motor and sources of relatively high and low pressures, operator-operated means connected to said lever to move said valve mechanism from normal position to connect said motor to said high pressure source to operate said pressure responsive unit, power transmitting means connected between said pressure responsive unit and said movable pivot and including a spring having a predetermined loading for transmitting movement to said movable pivot upon initial operation of said pressure responsive unit, and means connected to said pressure responsive unit and engageable with said lever upon an increase in resistance to movement of said member to a predetermined point at which said spring will be compressed, to transmit positive force from said pressure responsive unit to said lever.

3. A booster mechanism comprising a member to be operated, a lever pivotally supported on a movable pivot and connected to said member, a fluid pressure motor having a pressure responsive unit, a valve mechanism connected to said lever and controlling communication between said motor and sources of relatively high and low pressures, operator-operated means connected to said lever to move said valve mechanism from normal position to connect said motor to said high pressure source to operate said pressure responsive unit, a supporting lever, fixed pivot means connected to one end of said supporting lever, said movable pivot being connected to the other end of said supporting lever, a compression spring interposed between said pressure responsive unit and said supporting lever whereby initial movement of said pressure responsive unit will transmit force through said spring to said supporting lever to move said movable pivot, and a lost motion connection between said pressure responsive unit and said first-named lever at a point spaced from said movable pivot and from the point of connection of said operator-operated means to said first-named lever whereby, upon compression of said spring incident to predetermined resistance to movement of said member, said lost motion connection will be taken up to transmit power directly from said pressure responsive unit to said first-named lever.

4. A mechanism according to claim 3 wherein said lost motion connection comprises a member carried by said first-named lever, and an extension carried by said pressure responsive unit and normally spaced from said member.

5. A booster mechanism comprising a member to be operated, a supporting lever, a fixed pivot pin pivotally connected to one end of said supporting lever, a movable pivot pin connected to said supporting lever at the other end thereof, said movable pivot pin being connected to said member, an operating lever pivoted intermediate its ends on said movable pivot pin, a fluid pressure motor having a pressure responsive unit, a valve mechanism controlling communication between said motor and sources of relatively high and low pressures and normally connecting said motor to said low pressure source, operator-operated means connected to said operating lever, said operating lever being engageable with said valve mechanism to move the latter upon movement of said operator-operated member to connect said motor to said high pressure source, a spring connected between said pressure responsive unit and said supporting lever to transmit initial movement of said pressure responsive unit to said supporting lever and to said movable pin to move said member to be operated, and force transmitting means arranged between said pressure responsive unit and said operating lever for establishing mechanical connection therebetween upon compression of said spring incident to increased resistance to movement of said member to be operated, to transmit direct forces from said pressure responsive unit to said operating lever.

6. A mechanism according to claim 5 wherein said force transmitting means comprises a force transmitting member carried by said operating lever, and a member carried by said pressure responsive unit and having lost motion connection with said force transmitting member, which lost motion connection is taken up upon compression of said spring.

7. A mechanism according to claim 5 wherein said force transmitting means comprises a force transmitting pin carried by said operating lever, and an axial extension carried by said pressure responsive unit and normally spaced from said force transmitting pin to be engaged therewith upon movement of said pressure responsive unit after said spring is compressed, said movable pivot pin being arranged between said force transmitting pin and the point of connection of said operator-operated member with said operating lever.

8. A mechanism according to claim 5 wherein said spring is a compression spring having one end engaging said pressure responsive unit, and a spring seat engaging the other end of said spring, said supporting lever comprising a pair of spaced lever arms each having a laterally extending boss engaging said spring seat.

9. A mechanism according to claim 5 provided with means for limiting turning movement of said operating lever relative to said supporting lever, whereby, after maximum energization of said motor occurs, said levers will turn as a unit.

10. A mechanism according to claim 5 wherein one end of said operating lever is bifurcated to provide a pair of ends one of which has mechanical connection with said valve mechanism and normally engages said fixed pivot pin, the other of said ends being spaced from said fixed pivot pin and engageable therewith to limit turning movement of said operating lever relative to said supporting lever, whereby, after maximum energization of said motor, said levers will turn as a unit.

11. A motor mechanism comprising a casing, a pressure responsive unit in said casing forming therewith a variable pressure chamber, a valve mechanism normally connecting said chamber to a source of low pressure and movable for connecting said chamber to a source of higher pressure, a fixed pivot pin, a supporting lever connected at one end to said fixed pivot pin, a movable pivot pin connected to the other end of said supporting lever, a power operable member connected to said movable pivot pin, an operating lever pivotally supported by said movable pivot pin and engageable with said valve mechanism to operate it, operator-operated means connected to said operating lever to rock the latter about said movable pivot pin, a compression spring engaging said pressure responsive unit and said supporting lever to transmit force to said movable pivot pin to move said power operated member, said spring being of predetermined loading whereby, upon an increase in resistance to movement of said power-operated member, said spring will be compressed and said pressure responsive unit will move relative to said supporting lever, and motion transmitting means establishing mechanical connection between said pressure responsive unit and said operating lever upon said relative movement of said pressure responsive unit relative to said supporting lever.

12. A mechanism according to claim 11 wherein said motion transmitting means comprises a pin carried by said operating lever, said pressure responsive unit having a portion normally spaced from said last-named pin and engageable therewith upon said relative movement of said pressure responsive unit with respect to said supporting lever.

13. A mechanism according to claim 11 wherein said motion transmitting means comprises a pin carried by said operating lever, said pressure responsive unit having a portion normally spaced from said last-named pin and engageable therewith upon said relative movement of said pressure responsive unit with respect to said supporting lever, said movable pivot pin being arranged between said last-named pin and the point of connection of said operator-operated means with said operating lever.

14. A mechanism according to claim 11 wherein said operating lever is bifurcated adjacent said fixed pivot pin to provide a pair of ends one of which is mechanically connected to said valve mechanism and normally engages said fixed pivot pin, the other of said ends being normally spaced from said fixed pivot pin and being engageable therewith to limit turning movement of said operating lever relative to said supporting lever whereby said levers turn as a unit after said motor has been energized to a maximum extent.

References Cited in the file of this patent

UNITED STATES PATENTS

| | | |
|---|---|---|
| 2,006,487 | Sorensen | July 2, 1935 |
| 2,241,374 | Alfieri | May 13, 1941 |
| 2,690,740 | Hupp | Oct. 5, 1954 |
| 2,706,020 | Freers et al. | Apr. 12, 1955 |
| 2,766,732 | Schultz | Oct. 16, 1956 |
| 2,826,042 | Rike et al. | Mar. 11, 1958 |

FOREIGN PATENTS

| | | |
|---|---|---|
| 640,542 | Great Britain | July 19, 1950 |